US011858009B2

(12) United States Patent
Semeniuk et al.

(10) Patent No.: US 11,858,009 B2
(45) Date of Patent: Jan. 2, 2024

(54) CARD/CARRIER COMBINATION DIVERTER AND/OR SORTER SYSTEMS

(71) Applicant: ENTRUST CORPORATION, Shakopee, MN (US)

(72) Inventors: Maksim Semeniuk, Shakopee, MN (US); Roger Fischer, Shakopee, MN (US)

(73) Assignee: ENTRUST CORPORATION, Shakopee, MN (US)

( * ) Notice: Subject to any disclaimer, the term of this patent is extended or adjusted under 35 U.S.C. 154(b) by 193 days.

(21) Appl. No.: 16/297,025

(22) Filed: Mar. 8, 2019

(65) Prior Publication Data

US 2019/0275563 A1 Sep. 12, 2019

Related U.S. Application Data

(60) Provisional application No. 62/641,024, filed on Mar. 9, 2018.

(51) Int. Cl.

*B07C 5/38* (2006.01)
*B41F 17/14* (2006.01)
*B41F 21/00* (2006.01)

(52) U.S. Cl.

CPC ................ *B07C 5/38* (2013.01); *B41F 17/14* (2013.01); *B41F 21/00* (2013.01)

(58) Field of Classification Search

CPC ............. B07C 5/38; B41F 17/14; B41F 21/00
USPC .............................................................. 101/2
See application file for complete search history.

(56) References Cited

U.S. PATENT DOCUMENTS 3,884,370 A * 5/1975 Bradshaw ............... B07C 3/087 198/350
5,266,781 A 11/1993 Warwick et al.
5,358,238 A * 10/1994 Mandel .................. B65H 31/24 101/2
5,451,037 A 9/1995 Lundstrom
(Continued)

FOREIGN PATENT DOCUMENTS

GB 2570354 * 2/2018
JP 2003-281472 A 10/2003
(Continued)

OTHER PUBLICATIONS

International Search Report and Written Opinion; International Patent Application No. PCT/US2019/021362, dated Jun. 25, 2019 (11 pages).

*Primary Examiner* — Christopher E Mahoney
*Assistant Examiner* — Marissa Ferguson-Samreth
(74) *Attorney, Agent, or Firm* — Hamre, Schumann, Mueller & Larson, P.C.

(57) ABSTRACT

A card/carrier combination sorter system is described that is configured for use with a card/carrier combination production system. The sorter system includes an input that is in communication with an output of the production system so as to receive a plurality of card/carrier combinations one-by-one from the production system. The sorter system is configured to sort the plurality of card/carrier combinations into one or more bins of the sorter system. In some embodiments, a card/carrier combination is not diverted and is instead output through an output of the sorter system to an inserter system for insertion into an envelope and subsequent mailing.

14 Claims, 10 Drawing Sheets

(56) References Cited

U.S. PATENT DOCUMENTS

| | | | | |
|---|---|---|---|---|
| 5,588,763 | A | 12/1996 | Nubson et al. | |
| 6,902,107 | B2 | 6/2005 | Shay et al. | |
| 7,059,532 | B2 | 6/2006 | McCumber | |
| 9,334,138 | B1 | 5/2016 | Herrmann | |
| 2003/0038065 | A1* | 2/2003 | Pippin | B65H 29/14 209/584 |
| 2005/0139653 | A1* | 6/2005 | Zettler | B42D 25/405 235/380 |
| 2006/0124512 | A1 | 6/2006 | Quine et al. | |
| 2006/0191426 | A1* | 8/2006 | Timmerman | B31B 50/88 101/24 |
| 2010/0153310 | A1* | 6/2010 | Huebler | G07F 17/13 705/408 |
| 2015/0085047 | A1* | 3/2015 | Beech | B42D 5/027 347/104 |

FOREIGN PATENT DOCUMENTS

| | | | |
|---|---|---|---|
| KR | 10-1992-003988 | B1 | 5/1992 |
| KR | 10-2006-0102927 | A | 9/2006 |
| WO | 03065299 | * | 8/2003 |

* cited by examiner

CARD/CARRIER COMBINATION DIVERTER AND/OR SORTER SYSTEMS

FIELD

The technical disclosure herein relates to personalized plastic cards, such as financial cards including credit and debit cards, identification cards, driver's licenses, and other personalized plastic cards that are distributed to end users in mailed envelopes.

BACKGROUND

It is known to distribute personalized plastic cards to end users by mailing the cards in envelopes to the end users. In such systems, one or more cards are typically affixed to a card carrier form which is mechanically folded and then mechanically inserted into a mailing envelope in an inserter system for mailing to the intended end user. Typically, the production of the personalized plastic cards, the production of the card carrier forms, the affixing of the card(s) to the card carrier form, the folding of the card carrier form, and the insertion into the mailing envelope are performed in mechanical systems specifically designed to perform such tasks.

SUMMARY

A card/carrier combination sorter system is described that is configured for use with a card/carrier combination production system. The systems described herein include an input that is in communication with an output of the production system so as to receive a plurality of card/carrier combinations one-by-one from the production system. The described systems can selectively output some or all of the received card/carrier combinations to an inserter system that inserts the card/carrier combinations into envelopes for subsequent mailing to the intended recipients, and/or the described systems can divert some or all of the received card/carrier combinations and sort the diverted card/carrier combinations into bins. In one embodiment, the diverting and sorting functions can be combined into a single system. In another embodiment, the diverting function can be performed by one system and the sorting function can be performed by a different system.

The sorter system receives the card/carrier combinations one-by-one, and can output select ones of the card/carrier combinations through an output to an inserter system. The card/carrier combinations that are output through the output of the sorter system may be card/carrier combinations that are not sorted into a bin of the sorter system. Alternatively, the card/carrier combinations that are output through the output of the sorter system may be card/carrier combinations that are initially sorted into a bin of the sorter system, and thereafter fed from the bin and output from the sorter system. The inserter system receives the card/carrier combinations that are output from the sorter system and inserts the card/carrier combinations into envelopes for subsequent mailing to the intended recipients.

The sorter system described herein can perform a number of functions including, but not limited to: a) sort the card/carrier combinations into a plurality of bins; and/or b) sort some of the card/carrier combinations into one or more bins, where the sorted card/carrier combinations are not intended to be immediately inserted into envelopes, while other ones of the card/carrier combinations are output to an inserter system for insertion into envelopes.

The sorter system described herein provides the flexibility to run large unsorted production runs that have card/carrier combinations intended for output to the inserter system as well as having card/carrier combinations that are not intended for immediate output to the inserter system and that need to be sorted out from the card/carrier combinations that are intended for immediate output to the inserter system. In addition, the sorter system can be used to sort card/carrier combinations from one another without outputting any of the card/carrier combinations to the inserter system. The sorter system can automatically sort card/carrier combinations, increase production run sizes, and decrease system idle time, while eliminating the need to hand sort card/carrier combinations into different categories.

In another embodiment, the diverting and sorting functions can be separated into a diverter mechanism that diverts the card/carrier combinations, and a sorter mechanism that sorts the diverted card/carrier combinations. The diverter mechanism can include an input that is in communication with an output of the production system so as to receive a plurality of card/carrier combinations one-by-one from the production system, a first output that can be in communication with the inserter system, and a second output through which diverted card/carrier combinations can be directed to the sorter mechanism. The sorter mechanism can be connected to the diverter mechanism so that an input of the sorter mechanism is in communication with the second output of the diverter mechanism, and that is configured to sort the diverted card/carrier combinations into separate bins.

DRAWINGS

DETAILED DESCRIPTION

Figure 1:
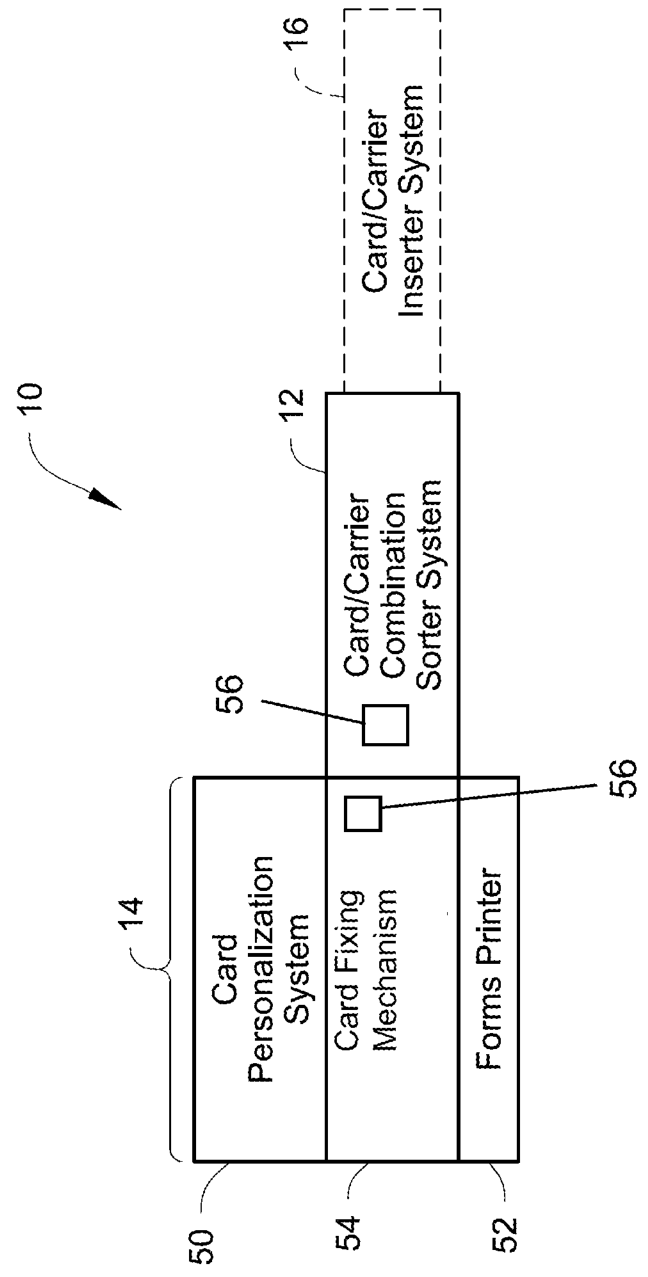
FIG. 1 illustrates a card/carrier handling system that includes a card/carrier combination sorter system described herein.

Referring to FIG. 1, a card/carrier handling system 10 is illustrated. The system includes a card/carrier combination sorter system 12 that is configured for use with a card/carrier combination production system 14. The sorter system 12 is configured to receive a plurality of card/carrier combinations one-by-one from the production system 14, sort some or all of the received card/carrier combinations into one or more bins of the sorter system 12, and in some embodiments output some of the card/carrier combinations to an inserter system 16 which is configured to insert the output card/carrier combinations into envelopes for mailing to the intended recipients.

The inserter system 16 is optional whereby the sorter system 12 can be used with or without the inserter system 16. When used without the inserter system 16, the sorter system 12 may receive the card/carrier combinations from the production system 14 and sort the card/carrier combinations into a plurality of the bins of the sorter system 12. The sorted card/carrier combinations in the bins can then be handled separately by, for example, being later input into an inserter system (which could be the inserter system 16 or a different inserter system) for insertion into envelopes and mailed to the intended recipients. When used with the inserter system 16, the sorter system 12 may receive the card/carrier combinations from the production system 14 and sort some of the card/carrier combinations into one or more bins of the sorter system 12, while other ones of the card/carrier combinations are not sorted but are instead immediately output from the sorter system 12 to the inserter system 16.

Figure 2A:
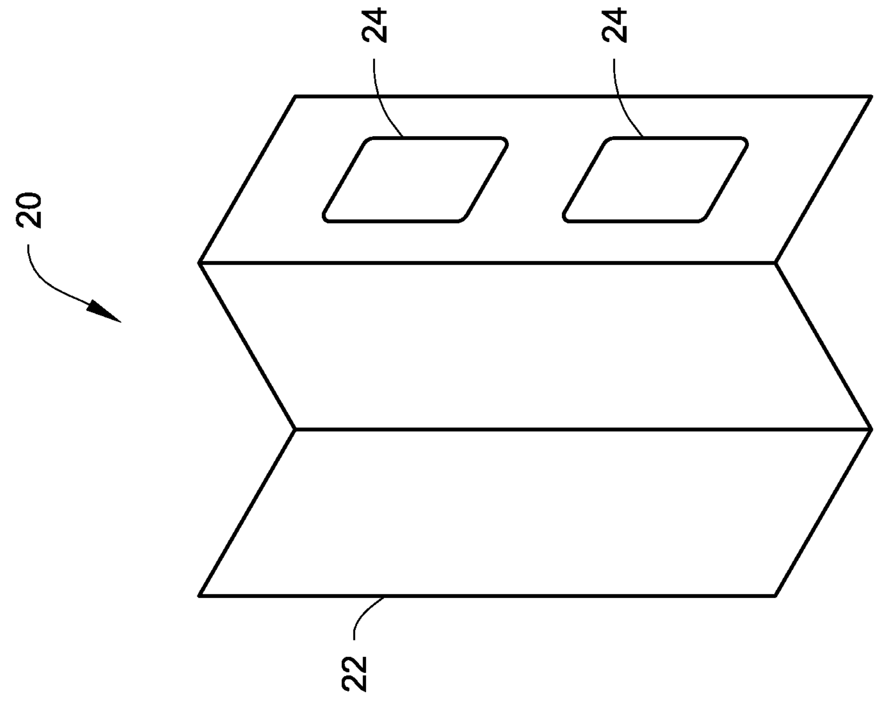
FIG. 2A illustrates an example of a tri-folded card/carrier combination that can be used with the sorter system described herein.
Figure 2B:
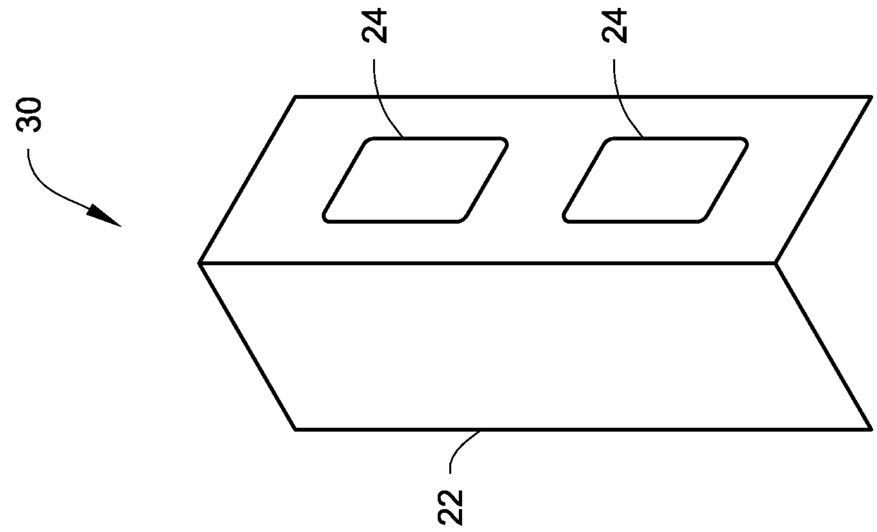
FIG. 2B illustrates an example of a bi-folded card/carrier combination that can be used with the sorter system described herein.

FIG. 2A illustrates an example of a card/carrier combination 20 that can be used with the sorter system 12. The card/carrier combination 20 includes a carrier form 22 and one or more personalized plastic cards 24 fixed to the carrier form 22. In the example of FIG. 2A, the carrier form 22 is illustrated as being tri-folded. FIG. 2B illustrates another example of a card/carrier combination 30 that can be used with the sorter system 12. The card/carrier combination 30 includes the carrier form 22 and one or more of the personalized plastic cards 24 fixed to the carrier form 22. In the example of FIG. 2B, the carrier form 22 is illustrated as being bi-folded. The examples in FIGS. 2A and 2B show two of the cards 24 attached to the carrier forms 22. However, a single card 24 or more than two cards 24 can be attached to the carrier forms 22.

The folding of the carrier form 22, whether tri-fold or bi-fold, can occur at any suitable location in the system 10. For example, the carrier form 22 can be folded in the production system 14 whereby the carrier form 22 is received by the sorter system 12 in its folded condition. Alternatively, the carrier form 22 (with the card(s) 24 attached thereto) can be output from the production system 14 in an unfolded condition, and then folded in the sorter system 12.

The card/carrier combinations 20, 30 can be of standard construction known in the art. The carrier form 22 is typically made from paper and can include printed information thereon such as terms of use of the personalized plastic card(s) 24, one or more logos for example of the issuer of the card(s) 24, the intended recipient's name and mailing address, and other conventional information. In some embodiments, the carrier form 22 can be pre-printed, with no printing on the carrier form 22 occurring in the production system 14. In other embodiments, the carrier form 22 can be pre-printed with some information with additional information, such as the intended recipient's name and mailing address, being printed on the carrier form 22 in the production system 14. In still other embodiments, the carrier form 22 can be substantially blank with all or substantially all of the information being printed on the carrier form 22 in the production system 14.

The personalized plastic cards 24 described herein include financial (e.g., credit, debit, or the like) cards, driver's licenses, national identification cards, business identification cards, gift cards, and other plastic or composite cards which bear personalized data unique to or assigned specifically to the cardholder, such as the name of the cardholder, an account number, an image of the face of the cardholder, and/or which bear other card information. The term "plastic card" or the like as used herein is intended to encompass cards that are completely or substantially plastic, as well as cards that have non-plastic or composite components and cards having other formulations that function like the card types indicated above.

Figure 3:
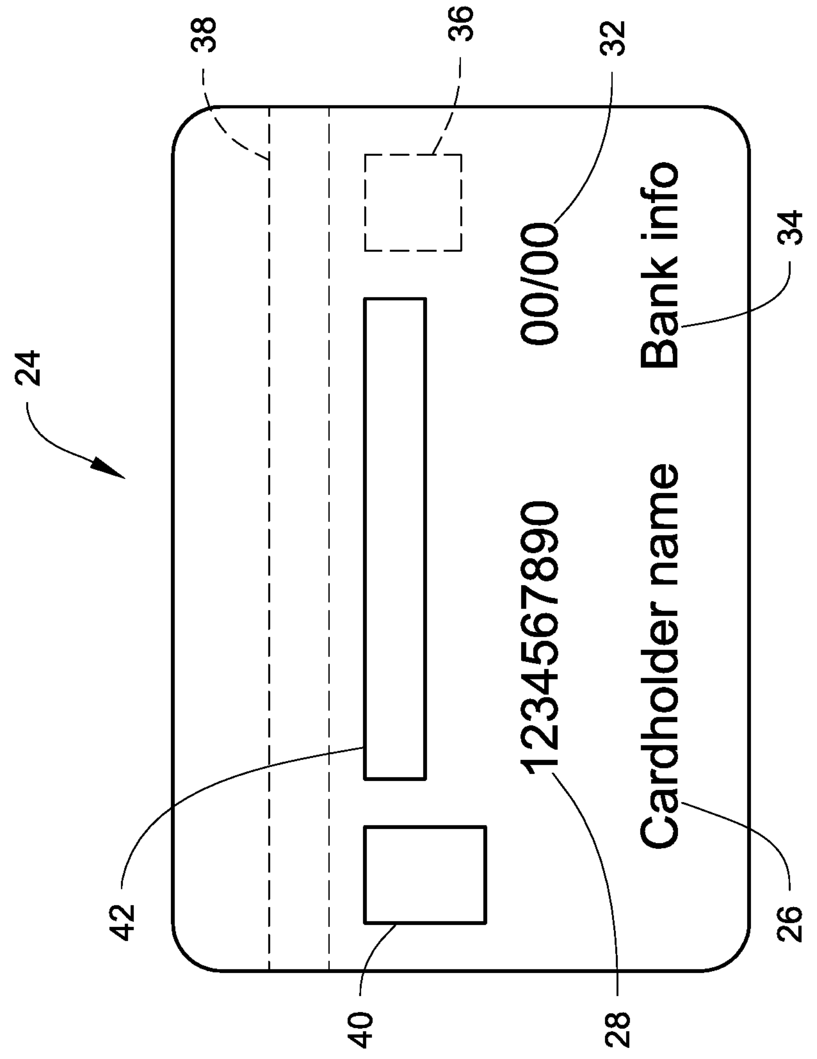
FIG. 3 illustrates an example of a personalized plastic card that can be attached to the card/carrier combinations described herein.

In one specific embodiment, and referring to FIG. 3, the personalized plastic cards 24 can be plastic financial cards. A financial card, which may also be referred to as a credit card or a debit card, as used herein refers to a type of card that allows the cardholder to borrow funds or that has a stored monetary value. As shown in FIG. 3, a financial card typically has at least a cardholder name 26, an account number 28, expiration date 32, and bank information 34 provided thereon, on the front and/or rear surface of the card, often by printing. A financial card may also have an integrated circuit chip 36 that stores data relating to the card and/or a magnetic stripe 38 that stores data relating to the card, as well as a security hologram 40 and a signature panel 42. However, the concepts described herein can be used with other types of plastic cards that have other configurations and bear other data.

Returning to FIG. 1, the production system 14 can have any configuration that is capable of personalizing the plastic cards 24, provide the carrier forms 22, attach the cards 24 to the carrier forms 22 to produce the card/carrier combinations 20, 30, preferably fold the carrier forms 22, and output the card/carrier combinations 20, 30 one-by-one through an output thereof to the sorter system 12.

In one non-limiting example, the production system 14 can be comprised of a separate card personalization system 50, a separate carrier form printer 52, and a separate card fixing mechanism 54. An example of a production system configuration is disclosed in U.S. Pat. No. 9,415,580 which is incorporated by reference herein in its entirety.

The card personalization system 50 can be any system that is designed to perform one or more personalization and/or processing operations on plastic cards. Examples of personalization and/or processing operations include, but are not limited to, printing, programming a magnetic stripe or an integrated circuit chip, laminating, embossing, laser personalization, indent printing, and the like, all of which are well known in the art. Examples of the type of personalization that can be added to the card include, but are not limited to, the user's name, the user's address, a photograph of the user, an account number assigned to the user, and other types of data well known to those of ordinary skill in the art.

The card personalization system 50 is often referred to as a central issuance system that is often room sized, configured with multiple personalization/processing stations or modules performing different personalization/processing tasks, and that is generally configured to process multiple cards at once in relatively high processing volumes (for example, on the order of hundreds or thousands per hour). An example of a central issuance system is the MX and MPR line of card issuance systems available from Entrust Datacard Corporation of Shakopee, Minnesota Central issuance systems are described in U.S. Pat. Nos. 6,902,107, 5,588,763, 5,451,037, and 5,266,781 which are incorporated by reference herein in their entirety.

In one embodiment, the cards 24 that are processed by the card personalization system 50 are mechanically input directly into the mechanism 54 for attaching to the carrier forms 22. In this embodiment, the card personalization system 50 is considered to be "in-line" with the mechanism 54, or in other words mechanically in-line with the mechanism 54 so that cards that are output from the card personalization system 50 can be transported by mechanical transport mechanisms that are well known in the art, for example transport rollers, transport belts and the like, into the mechanism 54. This embodiment tends to permit high throughput of cards since the cards do not need to be manually carried from an output of the card personalization system 50 and manually input into the mechanism 54. The integration of card personalization systems with card fixing mechanisms 54 is well known in the art, for example from the MXD™ card delivery system available from Entrust Datacard Corporation of Shakopee, Minnesota.

In another embodiment, the card personalization system 50 can be separate from, or "off-line" from, the card fixing mechanism 54 so that cards that are processed by and output from the card personalization system 50 must be manually input into the card fixing mechanism 54 by loading the cards into an input hopper of the card fixing mechanism 54.

The carrier form printer 52 prints the carrier forms 22 to which the card or cards 24 personalized in the card personalization system 50 are attached. An example of a carrier form printer is described in U.S. Pat. No. 7,059,532 the entire contents of which are incorporated herein by reference. The carrier form printer 52 can include a hopper containing carrier forms 22 to be printed on, and a printer mechanism that prints on the carrier forms 22. The carrier forms 22 can be printed with any text, graphics or other data that one wishes to add to the carrier forms. Examples of data that can be printed on the carrier forms include the names and addresses of the cardholders corresponding to the cards 24 to be attached to the carrier forms 22. The printed carrier forms 22 are then output into the fixing mechanism 54.

If printing on the carrier forms 22 is not required, the carrier forms 22 can be contained in a hopper in the form printer 52 and fed therefrom into the fixing mechanism 54 without any printing. In such an embodiment, the form printer 52 need not have a printer mechanism and can instead be referred to as a carrier form feeder.

In the card fixing mechanism 54, which may also be referred to as a transition module, the appropriate card(s) 24 is matched with and attached to the appropriate carrier form 22 to form the card/carrier combination 20, 30. In addition, if folding is to occur within the production system 14, the card/carrier combination 20, 30 can be folded in the card fixing mechanism 54 using a folding mechanism 56, and the folded card/carrier combinations 20, 30 are mechanically transported one-by-one through the output of the production system 14 and fed into the sorter system 12. If folding is to occur outside of the production system 14, for example in the sorter system 12 using the folding mechanism 56, the card/carrier combinations 20, 30 can be output one-by-one through the output in an unfolded condition and fed into the sorter system 12 where the card carrier/combination is folded prior to being diverted/sorted.

Figure 4:
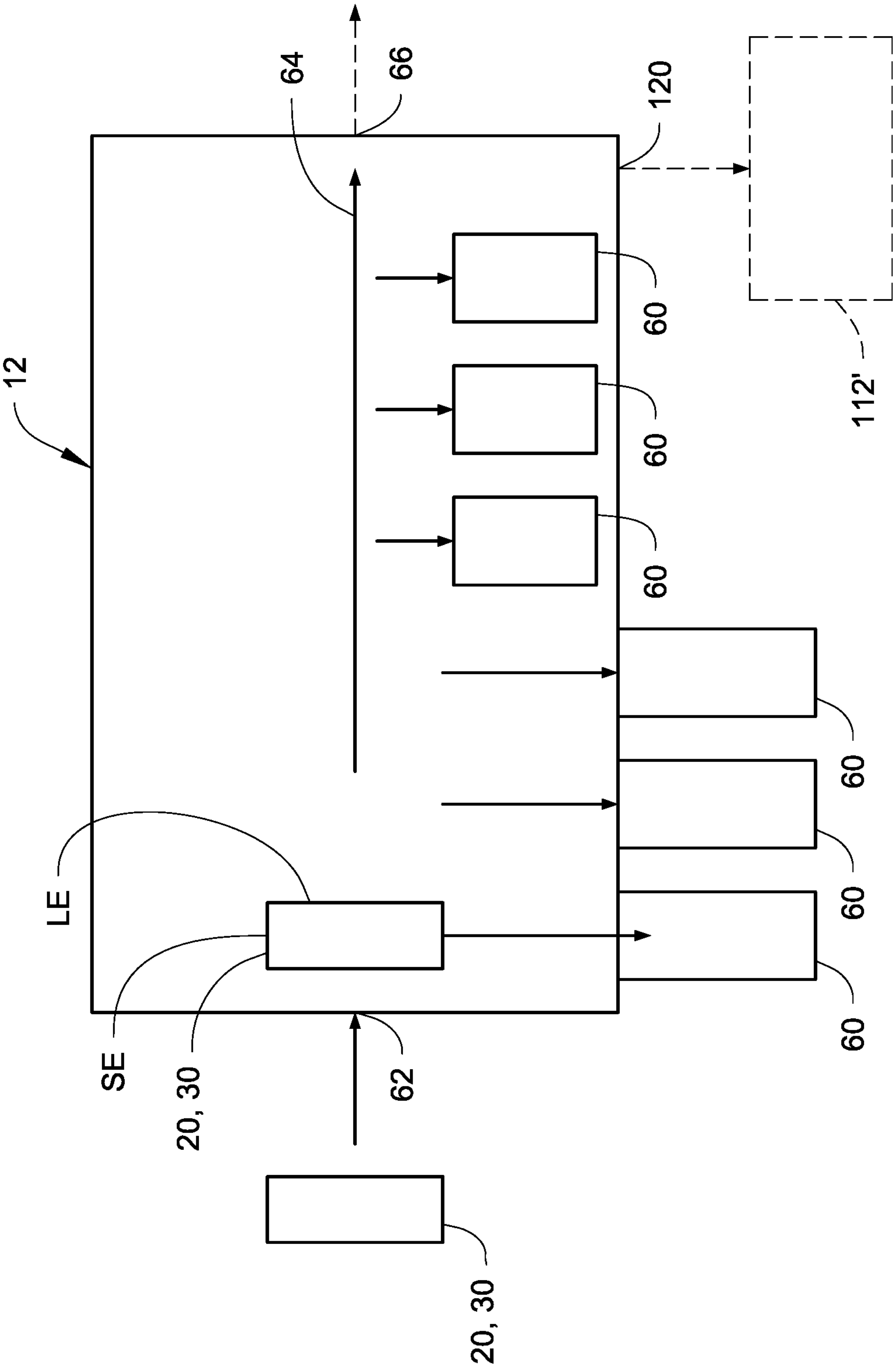
FIG. 4 illustrates a one embodiment of a card/carrier combination sorter system described herein.

Referring now to FIG. 4, an example configuration of the sorter system 12 is illustrated. The sorter system 12 can have any configuration that permits it to receive a plurality of the card/carrier combinations 20, 30 one-by-one from the production system 14, and sort some or all of the received card/carrier combinations 20, 30 into one or more bins 60 of the sorter system 12. In some embodiments, the sorter system 12 may also output some of the card/carrier combinations 20, 30 to the inserter system 16 which is configured to insert the output card/carrier combinations 20, 30 into envelopes for mailing to the intended recipients.

The sorter system 12 is illustrated as receiving the card/carrier combinations 20, 30 already folded, where the folding occurred with the production system 14 or in a separate mechanism upstream of the sorter system 12. The folded card/carrier combinations 20, 30 are received one-by-one through an input 62 of the sorter system 12 that is in communication with the output of the production system 14. The folded card/carrier combinations 20, 30 are transported along a transport path 64 that extends from the input 62. The folded card/carrier combinations 20, 30 can be transported along the transport path using any suitable transport mechanism(s) that are known in the art including, but not limited to, transport rollers, transport belts, and the like. Suitable mechanisms for transporting folded card/carrier combinations are known from the MXD™ card delivery system available from Entrust Datacard Corporation of Shakopee, Minnesota.

As shown in FIG. 4, the card/carrier combinations 20, 30 can be transported with long edges LE thereof substantially perpendicular to the direction of transport along the transport path 64 (i.e. the short edges SE thereof can be substantially parallel to the direction of transport along the transport path 64). A plurality of the bins 60 are spaced along the transport path 64. Each one of the bins 60 is configured to receive select ones of the card/carrier combinations 20, 30 therein, and to stack the card/carrier combinations 20, 30 side-by-side along their short edges SE. The card/carrier combinations 20, 30 are diverted from the transport path 64 and into the respective bin 60 by a diverter 70 (described below with respect to FIG. 6) that is associated with each bin 60.

The bins 60 can be located substantially on the exterior of the sorter system 12 (see the 3 bins 60 to the left in FIG. 4), the bins 60 can be located substantially within the interior of the sorter system 12 (see the 3 bins 60 to the right in FIG. 4), or some of the bins 60 can be located on the exterior and some of the bins 60 can be located within the interior. The bins 60 can be removably installed in the sorter system 12 to allow changes to the number of bins 60 that are used by removing and adding bins 60 to the sorter system 12. An identification system can also be used whereby each bin 60 is uniquely identified. This permits a user to know the types of card/carrier combinations 20, 30 that are stacked in each bin 60.

In embodiments where the sorter system 12 is used with the inserter system 16, the sorter system 12 further includes an output 66 disposed at the end of the transport path 64 through which certain ones (or even all) of the card/carrier combinations 20, 30 can be output to the inserter system 16.

Figure 5:
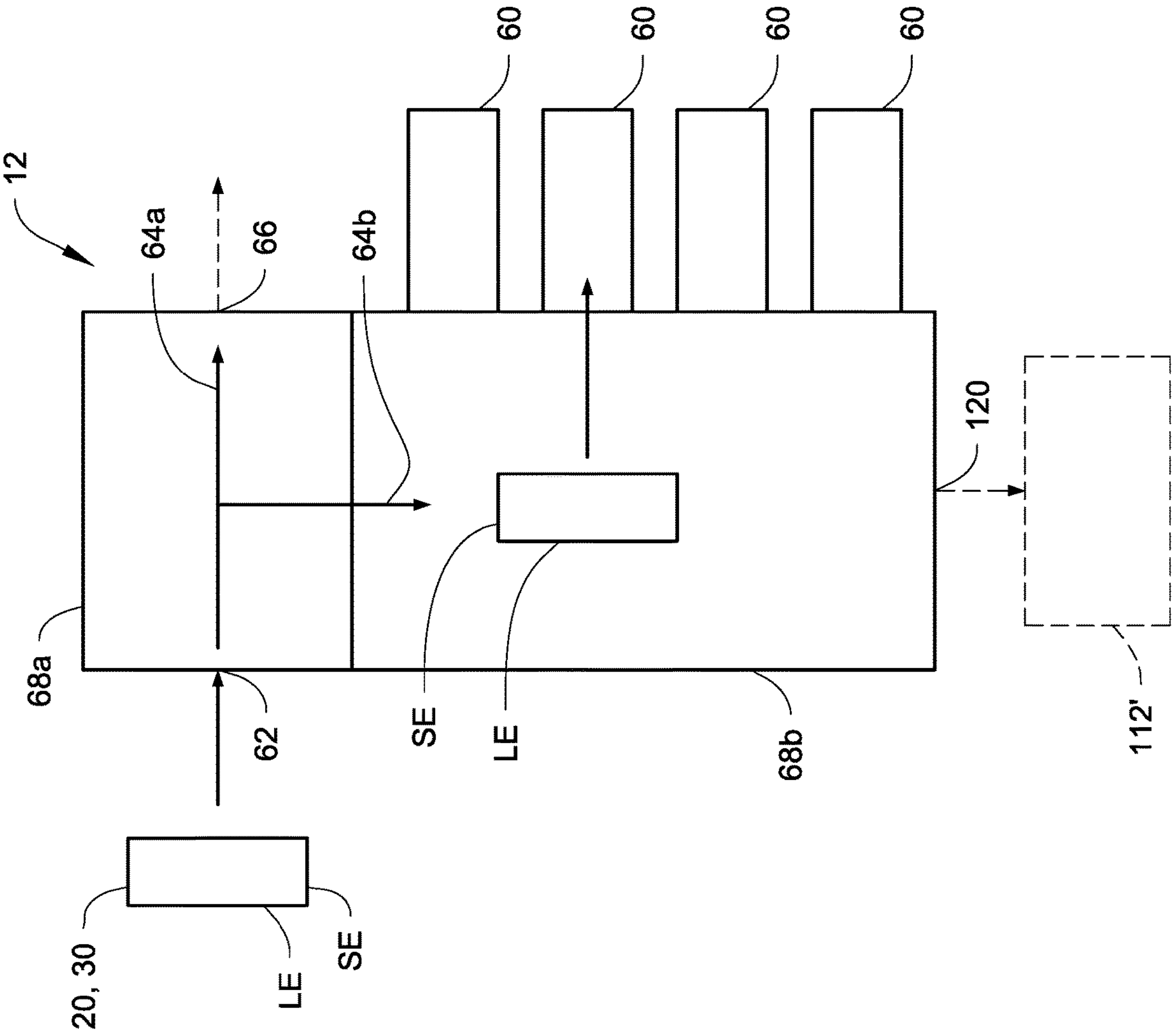
FIG. 5 illustrates another embodiment of a card/carrier combination sorter system described herein.

FIG. 5 illustrates another example configuration of the sorter system 12. This embodiment also illustrates the sorter system 12 as receiving the card/carrier combinations 20, 30 already folded, where the folding occurred within the production system 14 or in a separate mechanism upstream of the sorter system 12. The folded card/carrier combinations 20, 30 are received one-by-one through the input 62 of the sorter system 12 that is in communication with the output of the production system 14.

In the embodiment of FIG. 5, the sorter system 12 is illustrated as including a divert section 68*a* and a sorting section 68*b*. The divert section 68*a* includes a transport path 64*a* that extends from the input 62 to the optional output 66. In addition, a second transport path 64*b* extends from the transport 64*a* substantially perpendicular thereto, with the transport path 64*b* extending into the sorting section 68*b*.

The sorting section **68*b* further includes a plurality of the bins 60 spaced along the transport path 64*b*. The card/carrier combinations 20, 30 can be sorted by the sorting section 68*b* into the different bins 60. The bins 60 can be located substantially on the exterior of the sorting section 68*b*, the bins 60 can be located substantially within the interior of the sorting section 68*b*, or some of the bins 60 can be located on the exterior and some of the bins 60 can be located within the interior. The bins 60 can be removably installed in the sorting section 68*b* to allow changes to the number of bins 60 that are used by removing and adding bins 60. An identification system can also be used whereby each bin 60 is uniquely identified. This permits a user to know the types of card/carrier combinations 20, 30 that are stacked in each bin 60**.

As shown in FIG. 5, the card/carrier combinations 20, 30 enter the divert section **68*a* with the long edges LE thereof substantially perpendicular to the direction of transport along the transport path 64*a* (i.e. the short edges SE thereof can be substantially parallel to the direction of transport along the transport path 64*a*). The card/carrier combinations 20, 30 can be transported to the output 66 or diverted by a suitable diverter, similar to the diverter 70 described below with respect to FIG. 6, onto the transport path 64*b* and transported into the sorting section 68*b*. When a card/carrier combination 20, 30 is diverted onto the transport path 64*b*, the card/carrier combination 20, 30 now travels with its long edges LE substantially parallel to the direction of transport along the transport path 64*b* and the short edges SE thereof now substantially perpendicular to the direction of transport. The card/carrier combinations 20, 30 are then diverted from the transport path 64*b* and into the respective bin 60 by the diverter 70 (described below with respect to FIG. 6) that is associated with each bin 60. Each one of the bins 60 is configured to receive select ones of the card/carrier combinations 20, 30 therein, and to stack the card/carrier combinations 20, 30** side-by-side along their long edges LE.

In the embodiment of FIG. 5, the folded card/carrier combinations 20, 30 can be transported along the transport paths **64*a*, 64*b*** using any suitable transport mechanism(s) that are known in the art including, but not limited to, transport rollers, transport belts, and the like. Suitable mechanisms for transporting folded card/carrier combinations are known from the MXD™ card delivery system available from Entrust Datacard Corporation of Shakopee, Minnesota.

Figure 10:
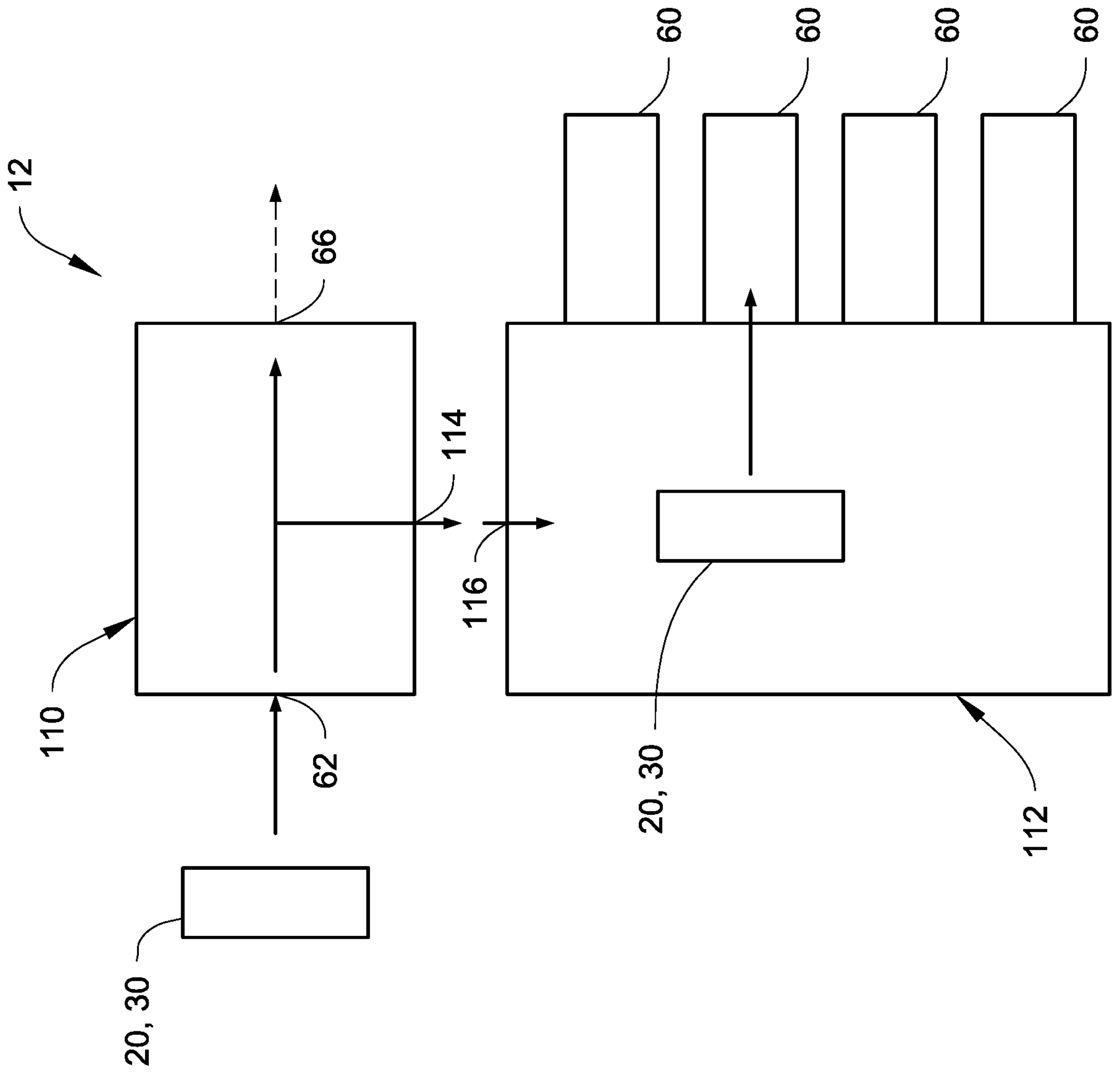
FIG. 10 illustrates another embodiment of a card/carrier combination sorter system described herein.

FIG. 10 illustrates another example configuration of the sorter system 12. In this embodiment, the diverting and sorting functions are performed in separate mechanisms that can be connectable and separable from one another. In particular, the sorter system 12 includes a diverter mechanism 110 and a separate sorter mechanism 112. The diverter mechanism 110 and the sorter mechanism 112 can be separately manufactured, sold and assembled together. This provides flexibility in manufacturing the diverter mechanism 110 and the sorter mechanism 112 and permits the diverter mechanism 110 to be used with different types of sorter mechanisms 112 as well as allowing the sorter mechanism 112 to be used with different types of diverter mechanisms.

The diverter mechanism 110 includes the input 62 that is in communication with the output of the production system 14 and through which the folded card/carrier combinations 20, 30 are received one-by-one. The diverter mechanism 110 also includes the output 66 (which can be referred to as a first output) that during use can communicate with the inserter system. The diverter mechanism 110 further includes a second output 114 through which diverted card/carrier combinations 20, 30 can be outputted from the diverter mechanism 110. The diverter mechanism 110 can include the diverter 70 described herein for diverting the card/carrier combinations.

The sorter mechanism 112 is configured to be connectable to the diverter mechanism 110 to sort the diverted card/carrier combinations into bins. For example, the sorter mechanism 112 can include an input 116 through which diverted card/carrier combinations that are output through the second output 114 of the diverter mechanism 110 can be input. The diverted card/carrier combinations can then be sorted into respective ones of the bins 60 as described above for FIG. 5.

In another embodiment, a sorter mechanism (for example, similar to the sorter mechanism 112 or a different sorter mechanism) can be connected to the system 12 in FIG. 4 or to the system in FIG. 5 (or to the sorter mechanism 112 in FIG. 10). The added sorter mechanism is illustrated diagrammatically in FIGS. 4 and 5 by element 112' in dashed lines. In such an embodiment, the systems 12 in FIGS. 4 and 5 would include an additional card/carrier combination outlet 120 that is in communication with an inlet of the additional sorter mechanism 112'. The added sorter mechanism 112' can expand the sorting capability of the systems 12 in FIGS. 4 and 5. For example, sorting of some of the card/carrier combinations can occur in the bins 60 of the systems 12, while additional sorting can occur in additional bins of the added sorter mechanism 112'.

Figure 6:
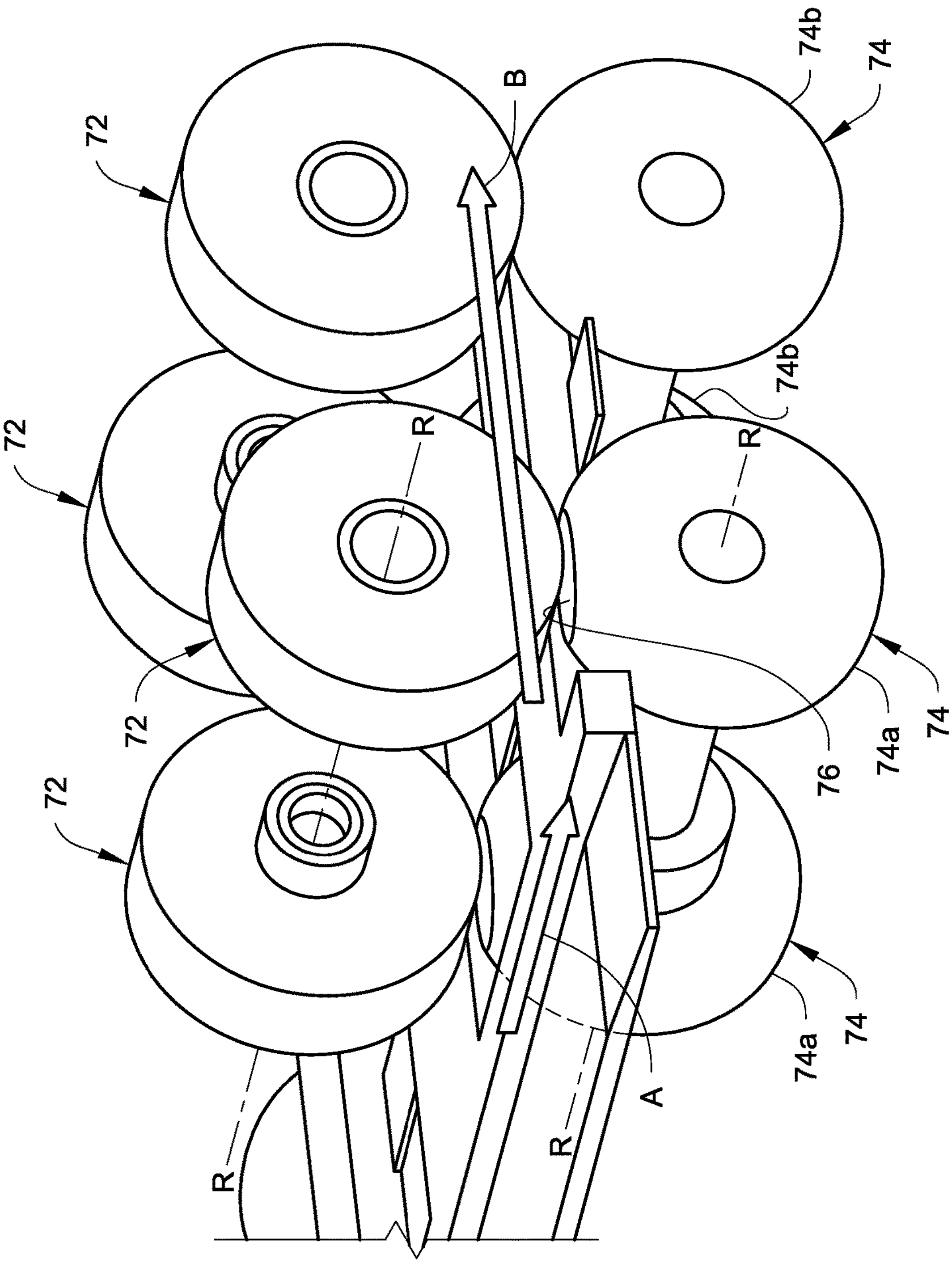
FIG. 6 illustrates an example of a diverter in the sorter system that can divert card/carrier combinations into a bin.
Figure 7:
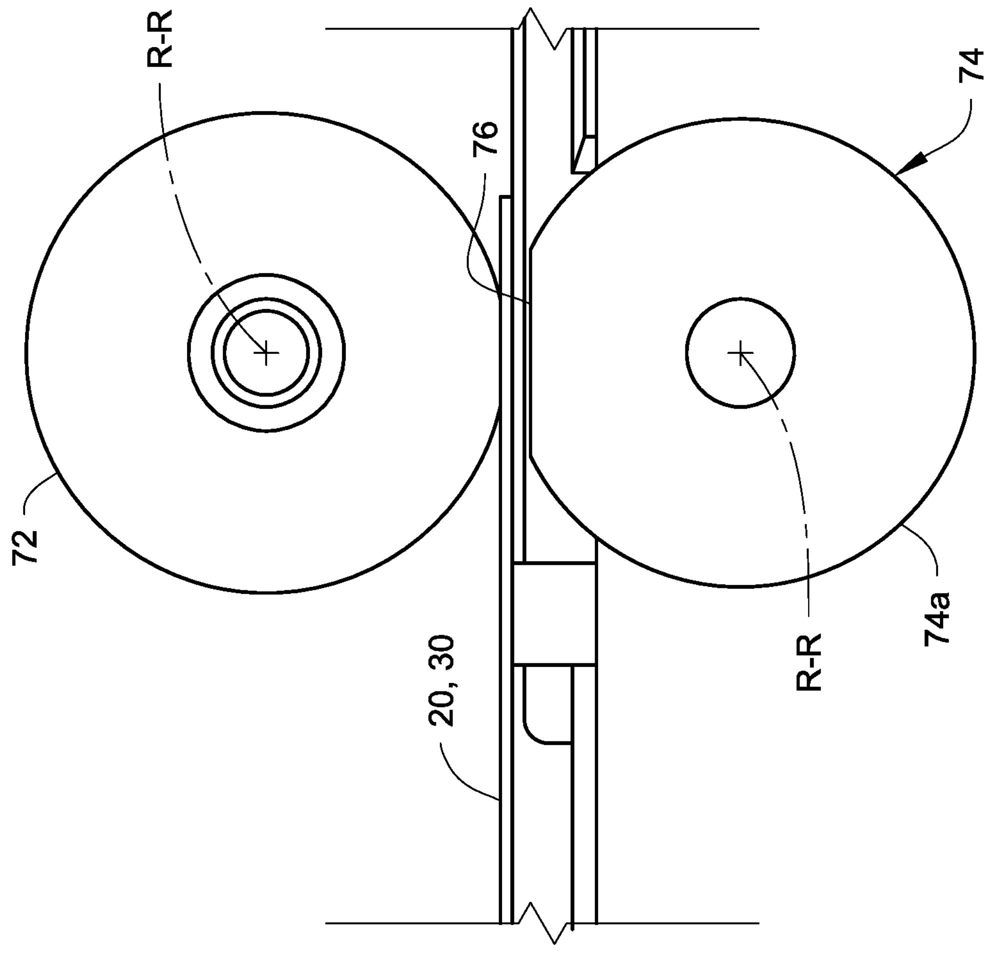
FIG. 7 is a side view of a portion of the diverter.

FIGS. 6 and 7 illustrate an example of the diverter 70 that can be used to divert the card/carrier combinations 20, 30 from the transport path 64 into the bins 60 (in FIG. 4), from the transport path **64*b* into the bins 60 (in FIG. 5), used in the diverter mechanism 110 and the sorter mechanism 112 of FIG. 10, or in the sorter mechanism 112'. A similar diverter can be used to divert the card/carrier combinations 20, 30 from the transport path 64*a* onto the transport path 64*b*. It is to be realized that the diverter 70 can have any configuration(s) suitable for diverting the card/carrier combinations 20, 30 as described herein. Further, each one of the bins 60 has one of the diverters 70** associated therewith.

In the example illustrated in FIGS. 6 and 7, the diverter 70 of one of the bins 60 is illustrated. The diverter 70 includes an upper set of transport rollers 72 and a lower set of transport rollers 74, with each one of the upper transport rollers 72 being associated with one of the lower transport rollers 74. The transport rollers 72, 74 are disposed above and below, respectively, the transport path 64, **64*b* so that the card/carrier combinations 20, 30 travel between the upper and lower transport rollers 72, 74 when traveling along the travel path 64, 64*b*. The arrow A in FIG. 6 indicates the direction of travel of the card/carrier combinations 20, 30 between the upper and lower transport rollers 72, 74. The transport rollers 72, 74 are each rotatable about an axis R-R that is parallel to the transport direction 64, 64*a*, 64*b* along which the card/carrier combination 20, 30 is being transported just prior to being diverted by the diverter 70**.

The upper and lower sets of transport rollers 72, 74 are initially spaced from one another to define a path of travel for the card/carrier combinations 20, 30 along the travel path 64, **64*b* between the rollers 72, 74. When a card/carrier combination 20, 30 is to be diverted, the upper and lower transport rollers 72, 74 are movable toward one another so as to bring the upper and lower transport rollers 72, 74 into engagement with the upper and lower surfaces of the card/carrier combination 20, 30. For example, the upper set of transport rollers 72 can be movable vertically toward and away from the lower set of transport rollers 74 which remain fixed in vertical position. In addition, the rollers of either the upper set of transport rollers 72 or the lower set of transport rollers 74 are in driving engagement with a drive motor (not shown) which drives the transport rollers, while the other set of rollers are idler rollers that are not driven. For example, the lower set of transport rollers 74 can be driven by the drive motor while the upper set of transport rollers 72** are the idler rollers.

When the upper and lower transport rollers 72, 74 are moved toward one another to bring the upper and lower transport rollers 72, 74 into engagement with the upper and lower surfaces of the card/carrier combination 20, 30, and when the transport rollers, such as the transport rollers 72 are driven, the card/carrier combination 20, 30 is driven in the direction of the arrow B in FIG. 6 thereby removing the card/carrier combination from the transport path 64, 64*b* and driving the card/carrier combination 20, 30 toward and possibly into the associated bin 60.

As illustrated in FIGS. 6 and 7, the rollers 74 of the lower set that are disposed in the transport path 64, 64*b* are formed with a flat spot 76. For example, the two rollers labeled 74*a* are disposed in the transport path 64, 64*b* and thus provided with the flat spot 76, while the two rollers 74 labeled 74*b* are not in the transport path 64, 64*b* and do not have the flat spot 76. This permits the rollers 74*a* to be positioned as shown in FIG. 6 with the flat spots 76 each facing upward. The flat spots 76 allow the card/carrier combinations 20, 30 to pass over the rollers 74*a* that are disposed in the transport path 64, 64*b* without interference from the rollers 74*a*. However, when the upper set of rollers 72 are dropped into diversion position and the rollers 74 rotated, the card/carrier combination 20, 30 is diverted in the direction B. As indicated above, a similar diverter can be used to divert the card/carrier combinations 20, 30 in FIG. 5 from the transport path 64*a* to the transport path 64*b*.

Figure 8:
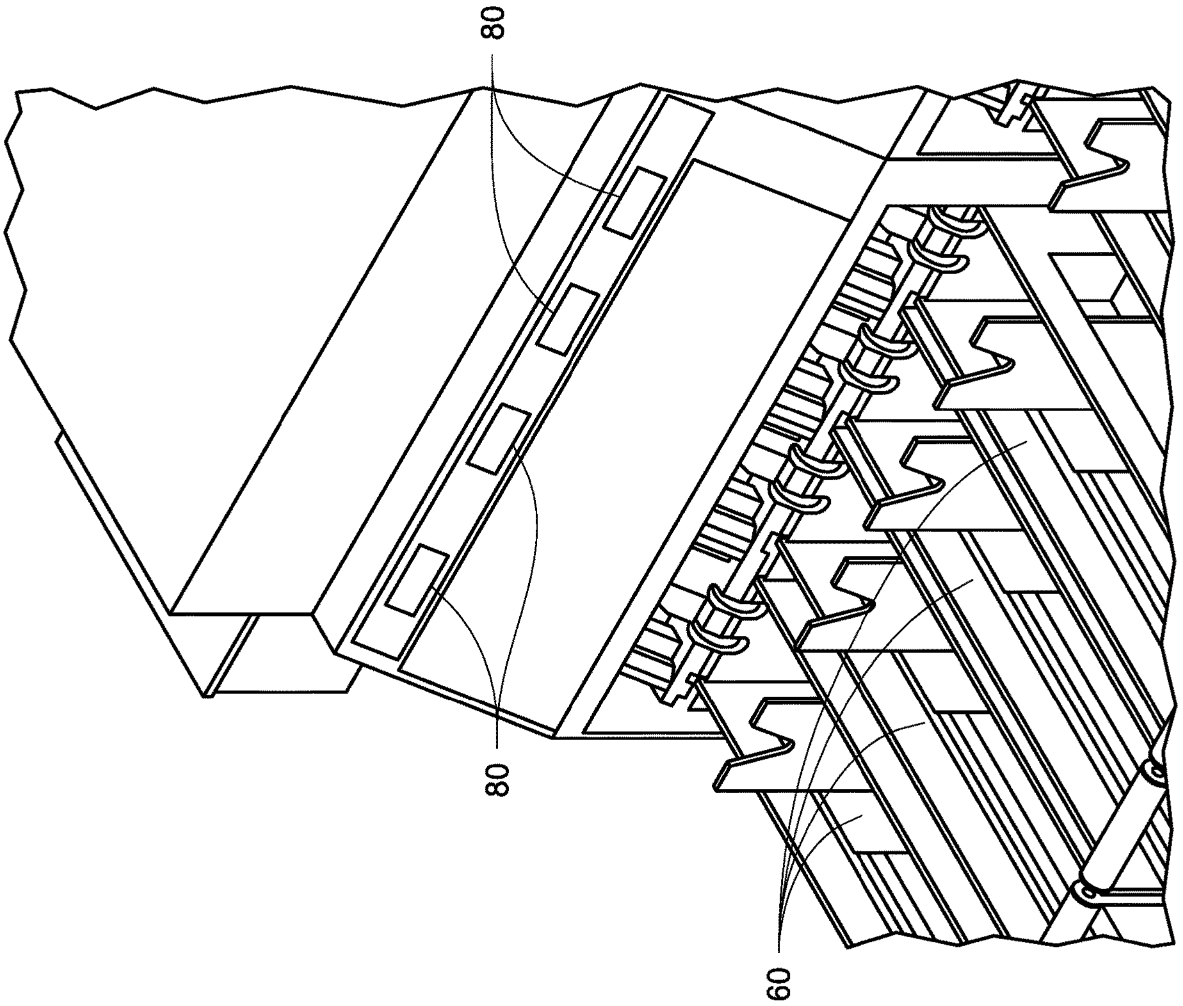
FIG. 8 illustrates a plurality of bins of the sorter system of FIG. 4.

FIG. 8 illustrates an example of an identification system that can be used to uniquely identify each bin 60 in either the system of FIG. 4 and/or in the system of FIG. 5. FIG. 8 shows four of the bins 60 arranged side-by-side. Each of the bins 60 has a display 80 associated therewith. Each display 80 can be, for example, an electronic display, such as a liquid crystal display, that can electronically display information relating to the bin 60. For example, the displayed information can uniquely identify the respective bin 60 and/or uniquely identify the card/carrier combinations 20, 30 that have been diverted into the associated bin 60. In addition to the preceding information, or separate from the preceding information, the displayed information on the display 80 may include a count of the number of card/carrier combinations 20, 30 diverted into the associated bin 60.

Figure 9:
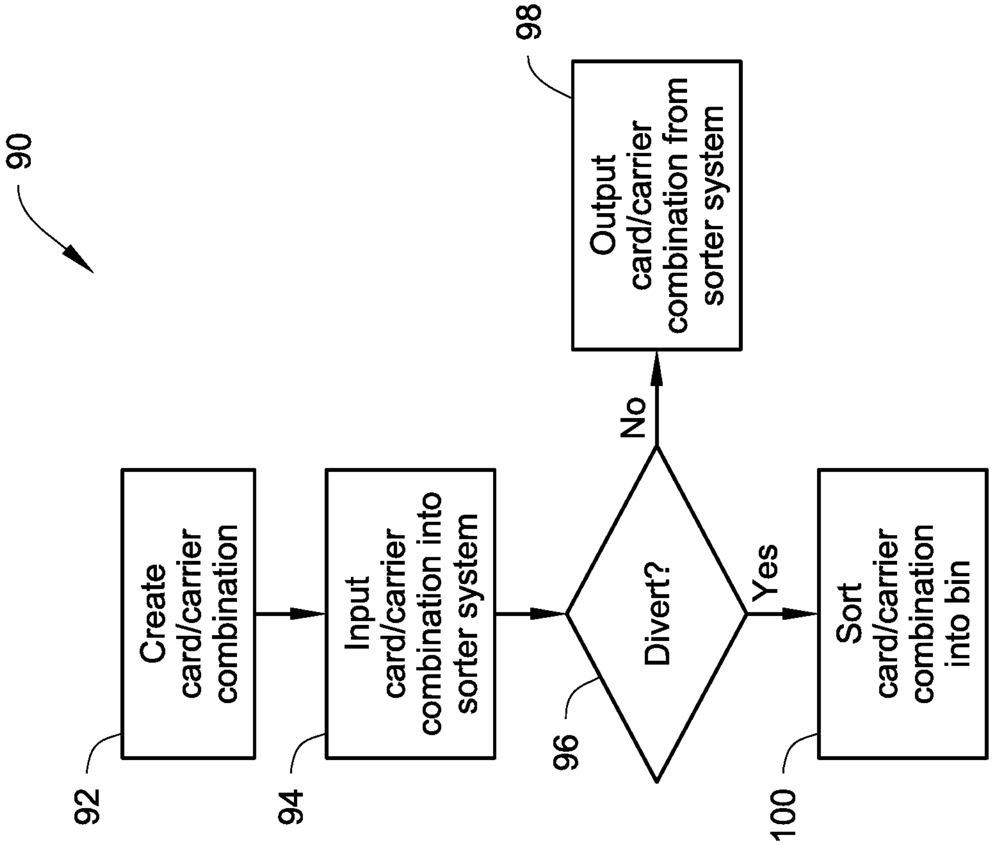
FIG. 9 illustrates an example card/carrier combination diversion process.

Referring to FIG. 9 along with FIGS. 4 and 5, an example card/carrier combination diversion process 90 is illustrated. In a step 92, the card/carrier combination 20, 30 is created. As described above, the card/carrier combination can be created by the production system 14. The card/carrier combination is then output from the production system 14 and input into the sorter system 12 in a step 94. A determination is then made at a step 96 whether or not the card/carrier combination is to be diverted. If the answer at step 96 is “no”, the card/carrier combination is output from the sorter system 12 at step 98, for example to the inserter system 16 for insertion into an envelope followed by mailing to the intended recipient. If the answer at step 96 is “yes”, the card carrier combination is sorted into the appropriate bin 60 at step 100.

The determination as to whether or not a card/carrier combination is to be diverted, as well as the sorting determination, can be made using suitable logic programmed into one or more controllers that control the operation of the sorter system 12. In one embodiment, the controller(s) keeps track of the position/location of each card/carrier combination 20, 30 within the system 10. The controller(s) also know the content of each card/carrier combination and whether or not each card/carrier combination is to be diverted, and if so, which one of the bins 60 the card/carrier combination is to be sorted in to. Therefore, the controller(s) knows when each card/carrier combination reaches the sorter system 12, and based on that knowledge knows whether or not each card/carrier combination is to be diverted and knows which bin each diverted card/carrier combination is to be sorted in to. As an alternative, the system 10 can track each card/carrier combination 20, 30 and a code or other information on each card/carrier combination can be read by one or more sensors, for example at the output of the production system 14 or within the sorter system 12. Based on the sensor reading, the controller(s) can then determine whether or not that card/carrier combination should be diverted.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method comprising:

receiving a plurality of folded card/carrier combinations that are not in envelopes one-by-one through an input of a card/carrier combination sorter system; and using the card/carrier combination sorter system to sort selected ones of the plurality of folded card/carrier combinations into a bin of the card/carrier combination sorter system, the bin is configured to receive the selected ones of the folded card/carrier combinations, and transporting additional ones of the plurality of folded card/carrier combinations one-by-one to an output of the card/carrier combination sorter system and outputting the additional folded card/carrier combinations one-by-one through the output, wherein the output is not associated with a bin.

2. The method of claim 1, further comprising using the card/carrier combination sorter system to sort selected ones of the plurality of folded card/carrier combinations into a plurality of bins, each of the bins is configured to receive the selected ones of the folded card/carrier combinations.

3. The method of claim 1, wherein the card/carrier combination sorter system includes a diverting mechanism that includes the input through which the folded card/carrier combinations are received one-by-one, the diverting mechanism having the output that is connectable to an inserter system and a second output that is connectable to a sorter mechanism that includes the bin; and using the diverting mechanism to divert selected ones of the plurality of folded card/carrier combinations to the output or to the second output.

4. The method of claim 1, wherein the input is located on a first side of the card/carrier combination sorter system, and the output is located on a side of the card/carrier combination sorter system different from the first side.

5. A card/carrier combination sorter system, comprising:

an input configured to receive a plurality of folded card/carrier combinations that are not in envelopes one-by-one into the card/carrier combination sorter system;

a transport path extending from the input along which the plurality of folded card/carrier combinations are transported in the card/carrier combination sorter system;

at least one bin that is configured to receive select ones of the plurality of folded card/carrier combinations;

a diverter disposed along the transport path that is engageable with the folded card/carrier combinations to divert the select ones of the plurality of folded card/carrier combinations from the transport path into the at least one bin; and an output that is configured to output additional ones of the plurality of folded card/carrier combinations therefrom one-by-one, the output is not associated with a bin.

6. The card/carrier combination sorter system of claim 5, further comprising a plurality of the bins, each bin is configured to receive select ones of the plurality of folded card/carrier combinations; and a plurality of the diverters, each one of the diverters is associated with a corresponding one of the bins, and each diverter is configured to divert the select ones of the plurality of folded card/carrier combinations from the transport path into the associated bin.

7. The card/carrier combination sorter system of claim 5, comprising a divert section and a sorting section; the divert section includes the input and the output; and the sorting section includes the at least one bin and the diverter.

8. The card/carrier combination sorter system of claim 7, wherein the divert section includes a diverter.

9. The card/carrier combination sorter system of claim 5, comprising a diverter mechanism and a sorter mechanism; the diverter mechanism includes the input and the output; and the sorter mechanism includes the at least one bin and the diverter.

10. The card/carrier combination sorter system of claim 9, wherein the diverter mechanism further includes:

a diverter; and a second output in communication with the transport path through which additional ones of the plurality of folded card/carrier combinations are output, the second output being connectable to the sorter mechanism.

11. The card/carrier combination sorter system of claim 5, wherein the input is located on a first side of the card/carrier combination sorter system, and the output is located on a side of the card/carrier combination sorter system different from the first side.

12. A card/carrier combination handling system, comprising:

a card/carrier combination production system that includes a card personalization system that is configured to personalize plastic cards, a carrier form printer that is configured to generate printed carrier forms, a card fixing mechanism that is configured to fix at least one personalized card to a printed carrier form to produce a card/carrier combination, and a folding mechanism that is configured to fold a card/carrier combination to produce a folded card/carrier combination;

the card/carrier combination production system further includes an output from which folded card/carrier combinations produced therein are output one-by-one; and a card/carrier combination sorter system connected to the output of the card/carrier combination production system, the card/carrier combination sorter system includes:

an input configured to receive a plurality of the folded card/carrier combinations one-by-one into the card/carrier combination sorter system;

a transport path extending from the input along which the plurality of folded card/carrier combinations are transported in the card/carrier combination sorter system;

at least one bin that is configured to receive select ones of the plurality of folded card/carrier combinations; and a diverter disposed along the transport path that is engageable with the folded card/carrier combinations to divert the select ones of the plurality of folded card/carrier combinations from the transport path into the at least one bin.

13. A card/carrier combination diverter mechanism, comprising:

an input configured to receive a plurality of folded card/carrier combinations that are not in envelopes one-by-one into the card/carrier combination diverter mechanism;

a transport path extending from the input along which the plurality of folded card/carrier combinations are transported in the card/carrier combination diverter mechanism;

a first output in communication with the transport path through which select ones of the plurality of folded card/carrier combinations are output, the first output being connectable to an inserter system;

a second output in communication with the transport path through which additional ones of the plurality of folded card/carrier combinations are output, the second output being connectable to a sorter mechanism;

a diverter in the transport path that is engageable with the folded card/carrier combinations to divert the folded card/carrier combinations to the second output.

14. The card/carrier combination diverter mechanism of claim 13, wherein the input is located on a first side of the card/carrier combination diverter mechanism, the first output is located on a side of the card/carrier combination diverter mechanism different from the first side, and the second output is located on a side of the card/carrier combination diverter mechanism different from the first side.

* * * * *